Sept. 5, 1967 R. G. CRAIG 3,339,690
EVACUATION SLIDE
Filed Oct. 23, 1965 2 Sheets-Sheet 1
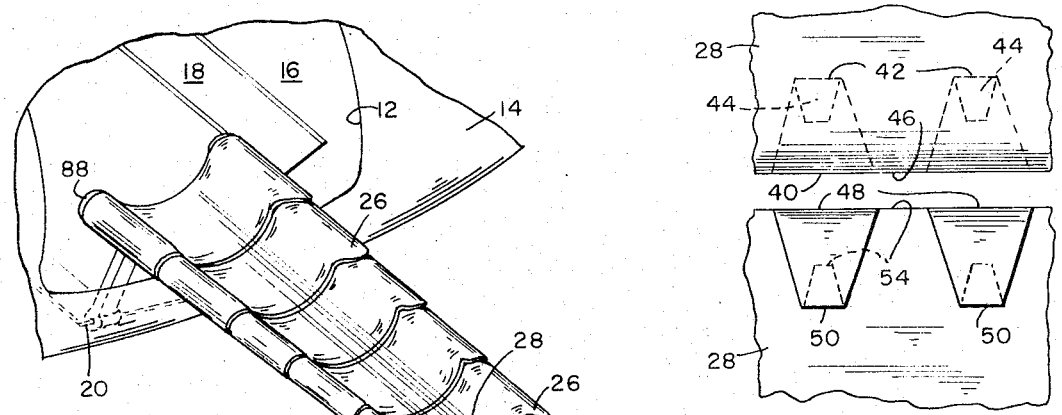
FIG. 1
FIG. 3 b
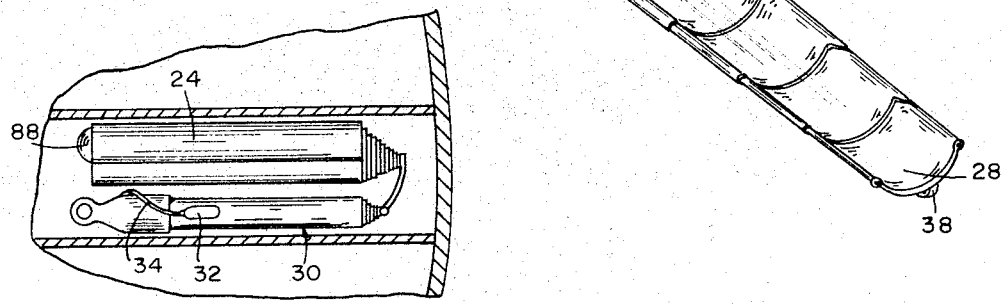
FIG. 4
FIG. 3 a
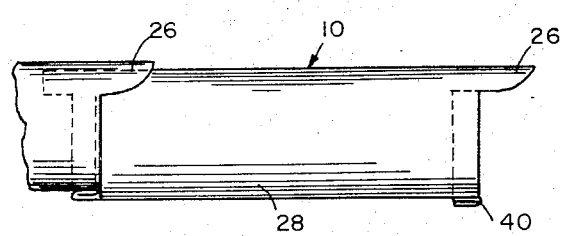
FIG. 3
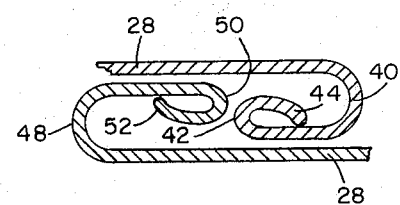
INVENTOR.
ROGER G. CRAIG
BY Head & Johnson
ATTORNEYS Sept. 5, 1967        R. G. CRAIG        3,339,690
EVACUATION SLIDE
Filed Oct. 23, 1965        2 Sheets-Sheet 2
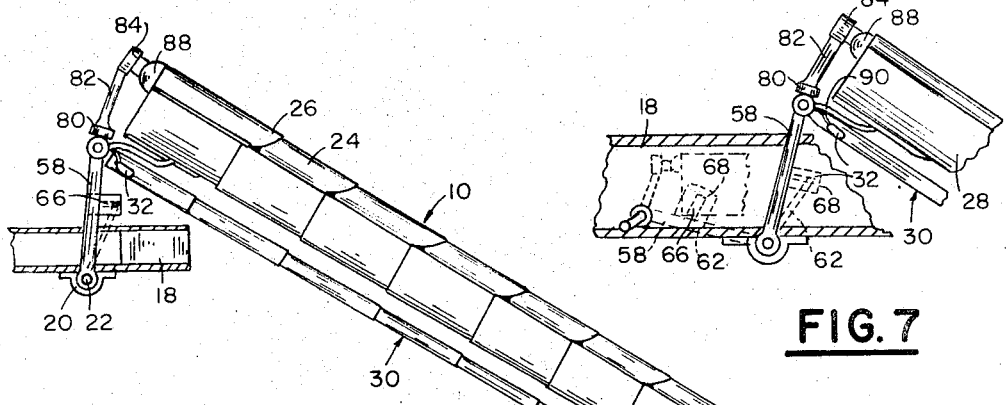
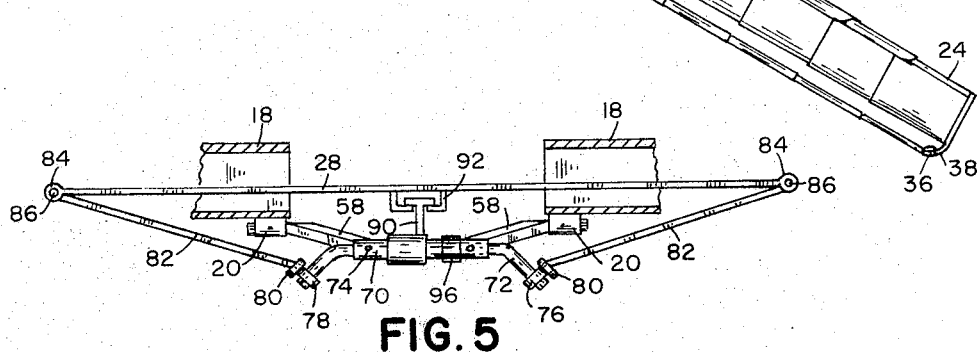
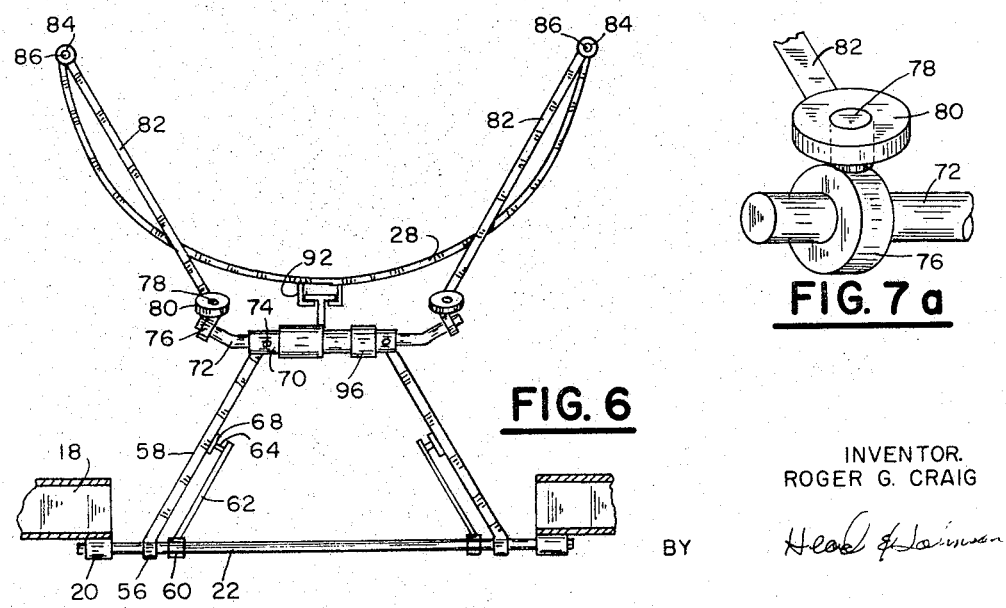
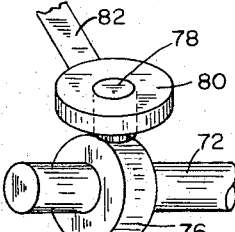
INVENTOR.
ROGER G. CRAIG
BY
ATTORNEYS

United States Patent Office 3,339,690
Patented Sept. 5, 1967

3,339,690
EVACUATION SLIDE
Roger G. Craig, Box 231, Collinsville, Okla. 74021
Filed Oct. 23, 1965, Ser. No. 503,734
6 Claims. (Cl. 193—6)

ABSTRACT OF THE DISCLOSURE

This invention provides an emergency evacuation slide for use with aircraft. The device is supported within the aircraft fuselage behind a side door opening and includes a telescoping evacuation slide pivotally mounted within the fuselage and behind the side opening door. The slide is extendible from a stored position to a telescopic elongated position by means of a telescopic drive tube extendible by hydraulic fluid pressure.

---

This invention relates to rescue devices. More particularly, this invention relates to rescue devices for airplanes in the form of evacuation slides having extensible slide portions. Still more particularly, this invention relates to extensible evacuation slides in which the extension of the slide device is accomplished by a fluid driving unit.

In an emergency landing of an airplane some form of escape means must be provided for the passengers in order to evacuate them in the quickest and safest manner. Modern day aircraft are equipped with a great many safety devices, and some of these are directed to the emergency unloading of passengers as rapidly and safely as possible. Among the self-contained types of unloading devices are various folding stairways. Most folding stairways presently in use are designed particularly for the loading of passengers and only incidentally for any emergency use. Consequently these stairways are generally cumbersome in size and include a great number of mechanical parts which make it necessary that they be operated by airline personnel familiar with the device. Also, these stairways are of such a design that there must be some assistance from ground personnel in the positioning of them for unloading. Then, too, if during such an emergency a stairway of this kind were placed in proper position, the combination of the numerous steps and the narrowness of the steps makes it necessary that the passengers are forced to leave the airplane slowly and cautiously.

Another type of emergency exit for distressed aircraft is a device somewhat similar to a fireman's pole which, in its inoperative condition, is stored on a crane arm inside the aircraft near the door. In an emergency, the nearby door is flung open, the crane arm swings out and a telescoping rod is lowered to the ground. Passengers leaving the aircraft must reach out to the pole and slide down with their arms and legs wrapped around the pole. It can readily be seen that this method of escape has several disadvantages. First, an uninitiated person must be quickly instructed by the use of this device, and this is a time consuming procedure particularly should the passenger be rather elderly. The usual distance from the floor of an aircraft entrance to the ground in our present-day large airliners range from approximately twelve to fifteen feet. Aside from the probability that a number of passengers will be hesitant about making such a descent, it is also likely that other persons attempting to descend by such a means will slip and fall, adding to the confusion and further slowing down the evacuation.

Various other escape means have been tried, among these are flexible slide systems having a slide portion of canvass or heavy rubber. These systems too have certain disadvantages. For example, if the flexible material is too slack, the passengers are injured by striking the ground too hard. If the flexible material is held too tautly, the passengers have been subjected to being bounced out of the slide and to the ground.

The primary object of this invention is to provide an evacuation device for airplanes which occupies a minimum amount of space, can be put into use without the necessity of prior instruction in such use, and which will convey the evacuating passengers quickly and safely to the ground.

Another object of this invention is to provide telescoping evacuation slide for airplanes which can be quickly extended to a rigid configuration in response to the activation of a power mechanism.

Still another object of this invention is to provide a telescoping evacuation slide for airplanes which can be extended in response to a fluid drive mechanism.

Further objects and advantages of the invention will become apparent from the following description and claims, and from the accompanying drawings, wherein:

FIGURE 1 is an isometric view of an evacuation slide prepared according to this invention showing the slide in an extended position.

FIGURE 2 is a side elevational view of an evacuation slide prepared according to this invention showing the slide in an extended position.

FIGURE 3 is an enlarged partial side elevational view of a portion of a slide of this invention showing the fitting of slide components.

FIGURE 3A is an enlarged cross-sectional view of a slide portion describing the interlocking components.

FIGURE 3B is a top elevational view of adjacent end portions of slide sections.

FIGURE 4 is a slide elevational view in partial cross-section of a slide of this invention in a stored position within an airplane.

FIGURE 5 is a partial rear elevational view of an evacuation slide of this invention showing the slide in a stored condition within an airplane compartment.

FIGURE 6 is a partial rear elevational view of an evacuation slide of this invention showing the slide in an up position as it extends from an airplane compartment.

FIGURE 7 is an enlarged partial slide elevational view of the linking mechanism of the evacuation slide of this invention.

FIGURE 7A is an enlarged detail view of the gear components of the linking mechanism.

This invention comprises a telescoping evacuation slide for aircraft which, in an inoperative position, is stored within a compartment of the aircraft near a door opening or other emergency opening and which, in an operative condition, extends telescopingly through a door opening to the ground. The slide portion itself is formed of thin, flexible sections of metal. In a stored position the slide sections are retracted slidably over adjacent sections and the connecting arm components are pivoted in such a manner that the evacuation slide is in effect "packaged" together so that it can occupy a small compartment within the aircraft, preferably beneath the floor. In use, the connecting arms are raised from their stored position and brought to an operative position which movement causes the slide sections to change from a flat position to a curved position, and then the actuation of the drive tube causes the slide sections to change from a flat position to a curved position, and then the actuation of the drive tube causes the slide sections to extend to their fully operative position.

Referring now to the figures in detail, FIGURES 1 and 2 show an evacuation slide prepared according to this invention in an extended, operative position. The slide is comprised of a series of slide sections 10 which operate telescopically in respect to adjacent slide sections. At the upper end of the slide an assembly of levers and bearing components are attached to the slide for positioning the slide in its inoperative stored position under an airplane floor and for holding the slide in its extended operative position through an opening in an airplane. FIGURE 1 is an isometric view of the slide extending through an opening 12 in an airplane fuselage 14. Preferably opening 12 will be a conventional passenger entrance to the airplane, but may be a specially designed escape opening provided for emergency use. In its folded and stored position the slide of this invention is preferably stored in a compartment provided beneath the floor 16 of the airplane in a space usually available between cross beams 18 of the airplane frame. When stored, the slide compartment is, of course, covered by a trap door not shown in the figures. The slide is attached to the aircraft cross beam 18 by means of a bearing member 20 into which is received an axle 22. The connection of bearing 20 and axle 22 is more clearly shown by a comparison of FIGURES 2 and 6. Bearing 20, axle 22, and the other linkage components attaching the slide to the airplane fuselage are described in greater detail hereinafter. In FIGURES 1 and 2 the manner in which the slide sections 10 are related to each other is clearly shown. An outer edge of each slide section 10 is formed into a tubular edge 24 in a manner that the tubular edge 24 of each succeeding slide section 10 is received slidably into the tubular edge 24 of the preceding slide section 10. That is, in a telescoped position the slide section 10 which is directly connected to the linkage assembly contains the outermost tubular edge 24 and the slide section 10 which, in the operative position of the slide, will constitute the slide section farthest removed from the airplane, will contain the innermost tubular edge 24. Each tubular edge 24 includes an extension 26 which overlaps the succeeding tubular edge and provides additional rigidity to the slide when the slide is in its operative position. Also, as shown in FIGURES 1 and 2, each body portion 28 of each succeeding slide section 10 is slidable over or beyond the outer body portion 28 of the preceding slide section 10. Additional rigidity to the extended slide is provided by the cooperation of tubular edges 24 being received within a preceding tubular edge and by body portion 28 being received outside a preceding body portion. FIGURE 2 also describes how a drive tube 30 is attached to the linkage assembly near one end of the slide and to the outermost slide section. In the embdiment of this drive tube described in FIGURES 2 and 4, one means of providing power for the extension of drive tube 30 is shown. A small cylinder of compressed gas 32 is attached to the outermost drive tube, that section which is pivotally attached to the linkage assembly. Other means of furnishing energy to propel the drive tube to its extended position are likewise available, such as, mechanical means as by a system of cables and gears powered either by hand or by an electric motor, or hydraulic means employing a pump and electric motor. However, for overall efficiency and compactness the preferred manner of providing the drive energy for extending drive tube 30 is by a small cylinder of compressed gas 32 which may be easily and quickly actuated by the opening of a small conventional valve means included therewith which permits the compressed gas to pass through line 34 and into drive tube 30. The outermost section of drive tube 30 is connected to outermost slide section 10 by a swivelable bearing member 36 secured to bracket 38.

FIGURES 3, 3A, and 3B, show the manner in which the slide sections 10 are received within each other. These figures show a unique system of interlocking the slide sections 10. By defining that end of each slide section 10 which is nearest the point of connection to the airplane as the innermost end and that end which is farthest removed from the airplane as the outermost end. A number of tab portions are formed in both the innermost and outermost ends of each slide section 10 by the process of removing a part of the metal spacedly along the edge of each slide section. At the outermost end of each slide section 10 the remaining metal tab is bent along a curved area 40, and a second bend is made at curved area 42 so that the remaining portion of this tab forms a locking lip 44, locking lips 44 being spaced along the end of body sections 10 in order that a flat edge 46 may be provided between each lip 44 so that the body section 10 can be given its curved conformation. Thus, each lip 44 is formed exteriorly of the cylindrical surface of slide sections 10, which becomes the exterior cylindrical surface as the slide is brought to its extended position.

Along the innermost end of each slide section 10 a correspondingly spaced arrangement of tabs is formed by removing portions of metal. The metallic tabs so remaining after portions of metal have been cut are bent along a curved portion 48 and are further bent along a curved portion 50 which permits the forming of a locking lip 52. As in the preparation of locking lips 44, locking lips 52 are spaced along the innermost edge of slide sections 10 so that between each curved area 48 is a flat edge 54. Thus, by spacing lips 52 apart, and permitting flat edges 54 to remain, permits the slide sections 10 to eventually assume a curved conformation. When the slide is in an extended operative position, locking lip 50 is located within the interior cylindrical curvature of each slide section 10.

Each adjacent slide section 10 is designed so that the locking lip 44 of one slide section will be positioned opposite the locking lip 52 of the next slide section so that when the slide is extended by operation of the drive tube, lips 44 and 52 cooperate to lock the slide in its extended position. Then, when it is desired to retract the slide, the locking action provided by the interaction of the locking lips is of a degree that it can be readily overcome by force applied to the end of the extended slide and directed toward the airplane.

FIGURES 4 and 5 describe the evacuation slide of this invention in an inoperative stored position as it appears in a storage compartment on an airplane. In the side view of FIGURE 4 it is shown how the tubular edges 24 of the slide sections telescope into each other with the innermost slide section receiving the tubular edges of all the other sections. Likewise the innermost section of drive tube 30 receives slidably therein all the other sections of drive tube.

FIGURES 5, 6 and 7 show the arrangement of the linkage assembly which connects the slide portion of this invention to the airplane. Around axle 22 is positioned a bearing 56 to which is attached an arm 58 so that arm 58 may pivot around axle 22. Near bearing 56 and positioned around axle 22 is another bearing 60 to which is attached a shorter arm 62 which, through a pin 64 secured to arm 62, slides in a slot 66 in a plate 68 secured to arm 58. Arm 62 by its motion in slot 66 provides a means of supporting arm 58 in position when arm 58 is raised in its stored position to an upright position. Pin 64 slides forward in slot 66 as arm 58 is raised and helps to hold arm 58 in that position. Each of the arms 58 is attached to either end of a cross member 70 into which is positioned a pair of bent arms or horns 72 which may be either a single member or two separate members secured within cross member 70. Each bent arm 72 is rotatably adjustable within cross member 70, but when the proper adjustment is made arms 72 are secured in this position by means of set screws 74. Adjacent the end of each arm 72 is positioned a bearing 76 which may be a ball bearing or roller bearing or some similar device. Secured to the exterior of the outer race of bearing 76 is a pin 78 which is further secured to the inner race of a bearing 80 which is similar to bearing 76. Thus, the combined motions permitted by bearings 76 and 80 permit free movement in two planes of an arm 82 secured to the outer race of bearing 80. The other end of arm 82 is connected to another bearing 84 which includes a pin member 86 pivotally attached to an end cap 88 of the innermost slide section.

Near the center of cross member 70 and secured to the outer portion thereof is a bent arm member 90 which is received in a slot 92 of a shallow receptacle 94 secured to the outer portion of the first slide section and adjacent the innermost end thereof. Bent arm 90 provides additional support and locking means for the slide sections.

Positioned near one end of cross-section 70 is a sleeve 96 which pivotally receives one end of drive tube 30. It is to be noted that sleeve 96 is off-center of cross member 70 whereas bracket 38 to which the forwardmost section of drive tube 30 is attached is on-center. This arrangement of drive tube 30 provides additional strength and rigidity to the slide.

In operation, when the slide is to be used a doorway in the floor of the airplane is raised exposing the evacuation slide of this invention. The slide is grasped by any of the exposed components, but a handle or system of handles may be provided wherever convenient, and the slide is raised upward from the storage compartment by the rotation of arms 58 around axle 22. Mentioned above, when arms 58 are brought to an upward position, pin 64 on arm 62 slides forward in slot 66 and acts as a brace for arms 58. In the stored position of the slide as shown in FIGURE 5 it is seen that arms 82 have been rotated about bearings 80 and 76 so that body portions 28 of all slide sections 10 are stretched essentially horizontal. When the slide is to be raised the procedure is to be reversed and arms 82 are brought to an upright position by the movement of bearings 76 and 80, and with the assumption of this upright position, all of the body portions 28 now assume a curved configuration, and the slide is now ready to be extended by the actuation of drive tube 30 described hereabove, drive tube 30 is propelled by a compressed gas source 32. As the conventional valve on gas cylinder 32 is opened, gas under high pressure flows through tube 34 and into the interior of drive tube 30 to force the tube to it extended position, carrying all the slide sections 10 to their fully extended position. As mentioned above too, when the slide sections 10 assume their fully extended position they become locked in position by the interaction of locking lips 44 and 52. The slide is thus quickly and very easily placed in its operative position and is ready for the evacuation of passengers from the distressed aircraft. The passengers may safely leave the aircraft in rapid succession with no fear of falling since the slide is held rigidly in position and the passengers are further protected by the depth of curvature of the slide sections.

Since many different embodiments of this invention may be made without departing from the spirit and scope thereof, it is to be understood that the specific embodiments described in detail herein are not to be taken in a limiting sense, since the scope of the invention is best defined by the appended claims.

What is claimed:
1. In an airplane having a fuselage with a side opening and an interior floor and an opening in said floor adjacent said side opening,
  a telescoping evacuation slide pivotally mounted within said floor opening and beneath said floor, said slide movable from a stored position beneath said floor to a telescoped position through said side opening, and
  a telescopic drive tube connected to said slide to cooperate telescopically with said slide in both an extended position and an inoperative position, said drive tube being extendible by fluid means.

2. A device as claimed in claim 1 in which said fluid means includes compressed gas means in which said drive tube is connected to a cylinder of compressed gas.

3. A device as claimed in claim 1 in which said fluid means includes an electrically operated pump drivably connected to a source of hydraulic fluid in order to operate said drive tube by means of high pressure hydraulic fluid.

4. In an airplane having a fuselage with a side opening and an interior floor and an opening in said floor adjacent said side opening,
  a telescoping evacuation slide pivotally mounted within said floor opening and beneath said floor, said slide including
  a first pivotable mounting secured to said airplane, means connecting said first pivotable mounting to a second adjustable pivotable means, said second adjustable pivotable means further connected to a third pivotable mounting, said third pivotable mounting connecting to one end of said telescopic slide, said telescopic slide including a series of flexible interlockable slide sections, said telescopic slide movable from an initial stored position within said fuselage to a telescoped position extending through said side opening, and
  actuating means to cause said slide to move from said initial position to said telescoped position, said actuating means including a telescoping drive tube connected to said slide, said drive tube actuably responsive to high pressure fluid means wherein said high pressure fluid acts upon said drive tube to force said drive tube to an extended position, and wherein said drive tube cooperates with said slide to bring said slide to an extended position.

5. A device as claimed in claim 4 in which said high pressure fluid means includes a source of compressed gas.

6. A device as claimed in claim 4 in which said high pressure fluid means includes a pump and a source of hydraulic fluid, wherein said pump provides high pressure hydraulic fluid to act upon said drive tube to extend said slide.

References Cited

UNITED STATES PATENTS

| | | | |
|---|---|---|---|
| 2,765,131 | 10/1956 | Boyle | 193—25 |
| 2,942,816 | 6/1960 | Dostie | 244—137 |
| 3,016,975 | 1/1962 | Gogol et al. | 182—48 |
| 3,027,966 | 4/1962 | Johnson et al. | 193—6 |

ANDRES H. NIELSEN, *Primary Examiner.*